United States Patent
Kim et al.

(10) Patent No.: US 8,741,453 B2
(45) Date of Patent: Jun. 3, 2014

(54) CURRENT INTERRUPTING DEVICE AND SECONDARY BATTERY INCLUDING CURRENT INTERRUPTING DEVICE

(75) Inventors: Kyounghan Kim, Yongin-si (KR); Moonhong Han, Yongin-si (KR); Junsun Yong, Yongin-si (KR); Seongdae Ji, Yongin-si (KR); Cheolwoo Shim, Yongin-si (KR); Kwangchun Kim, Yongin-si (KR); Jeongman Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 175 days.

(21) Appl. No.: 12/854,854

(22) Filed: Aug. 11, 2010

(65) Prior Publication Data

US 2011/0081560 A1    Apr. 7, 2011

(30) Foreign Application Priority Data

Oct. 1, 2009  (KR) .................. 10-2009-0094012

(51) Int. Cl.
*H01M 10/42*  (2006.01)
*H01H 85/044*  (2006.01)
*H01H 85/143*  (2006.01)

(52) U.S. Cl.
USPC ............... 429/7; 429/112; 429/181; 429/175; 429/62; 337/290; 337/227

(58) Field of Classification Search
USPC ............... 429/62, 112, 181, 7, 175; 361/642; 337/290, 227
See application file for complete search history.

(56) References Cited

U.S. PATENT DOCUMENTS

| | | | | |
|---|---|---|---|---|
| 5,358,798 A | * | 10/1994 | Kleinert et al. | 429/7 |
| 5,745,023 A | * | 4/1998 | Totsuka | 337/160 |
| 5,783,326 A | * | 7/1998 | Hasebe | 429/57 |
| 5,898,357 A | | 4/1999 | Endo et al. | |
| 5,939,217 A | * | 8/1999 | Tamura et al. | 429/7 |
| 7,106,165 B2 | * | 9/2006 | Mukai et al. | 337/405 |
| 7,354,677 B2 | * | 4/2008 | Yoshizawa et al. | 429/62 |
| 7,462,416 B2 | * | 12/2008 | Kim | 429/62 |

(Continued)

FOREIGN PATENT DOCUMENTS

| | | |
|---|---|---|
| EP | 1357569 A1 | 10/2003 |
| JP | 03-043925 | 2/1991 |

(Continued)

OTHER PUBLICATIONS

Notice of Allowance dated Nov. 1, 2011 for corresponding KR Application No. 10-2009-0094012.

(Continued)

*Primary Examiner* — Joseph S Del Sole
*Assistant Examiner* — Nahida Sultana
(74) *Attorney, Agent, or Firm* — Knobbe Martend Olson & Bear LLP

(57) ABSTRACT

Disclosed are a current interrupting device and a secondary battery including the same. According to an embodiment, a current interrupting device comprises a first terminal; a second terminal; a fuse coupled to the first and second terminals; and a fuse body surrounding an exterior of the fuse to seal the fuse, wherein the first and second terminals include thin portions connected to the fuse, and the thin portions have a thickness less than a thickness of other portions of the first and second terminals.

13 Claims, 4 Drawing Sheets

(56) References Cited

U.S. PATENT DOCUMENTS

| | | | |
|---|---|---|---|
| 7,763,375 B2* | 7/2010 | Igoris et al. | 429/62 |
| 7,858,221 B2* | 12/2010 | Sato | 429/121 |
| 2002/0113685 A1* | 8/2002 | Izaki et al. | 337/405 |
| 2002/0155354 A1* | 10/2002 | Wariishi et al. | 429/317 |
| 2003/0077484 A1* | 4/2003 | Cho | 429/7 |
| 2004/0070486 A1* | 4/2004 | Senda et al. | 337/405 |
| 2004/0170887 A1* | 9/2004 | Masumoto et al. | 429/61 |
| 2005/0083166 A1* | 4/2005 | Senda et al. | 337/159 |
| 2005/0264394 A1 | 12/2005 | Furuuchi | |
| 2009/0111007 A1* | 4/2009 | Naganuma | 429/82 |
| 2009/0130550 A1 | 5/2009 | Kim | |
| 2011/0244281 A1* | 10/2011 | Byun | 429/62 |
| 2011/0314671 A1* | 12/2011 | Darr et al. | 29/876 |
| 2012/0263976 A1* | 10/2012 | Byun et al. | 429/7 |
| 2013/0004799 A1* | 1/2013 | Bang et al. | 429/7 |
| 2013/0011699 A1* | 1/2013 | Kim et al. | 429/7 |
| 2013/0017421 A1* | 1/2013 | Onnerud et al. | 429/61 |
| 2013/0034750 A1* | 2/2013 | Choi et al. | 429/7 |
| 2013/0108900 A1* | 5/2013 | Lee et al. | 429/62 |

FOREIGN PATENT DOCUMENTS

| | | | |
|---|---|---|---|
| JP | 10-172414 | 6/1998 | |
| JP | 10-228857 | 8/1998 | |
| JP | 2000-090792 A | 3/2000 | |
| JP | 2003-016895 | 1/2003 | |
| JP | 2004-071552 A | 3/2004 | |
| JP | 2010-244968 | 10/2010 | |
| KR | 10-2003-0032562 | 4/2003 | |
| KR | 10-2005-0110504 | 11/2005 | |
| KR | 10 2005 0110504 | 11/2005 | |
| KR | 10-2009-0050179 | 5/2009 | |
| WO | WO2004066446 A1 * | 8/2004 | H01R 4/02 |

OTHER PUBLICATIONS

European Search Report dated Feb. 16, 2011 in corresponding Application No. 10251639.0.

Office Action dated Aug. 14, 2012 for corresponding JP Application No. 2010-096007.

Notice of Allowance dated Jul. 2, 2013 for corresponding JP Application No. 2010-096007.

* cited by examiner

CURRENT INTERRUPTING DEVICE AND SECONDARY BATTERY INCLUDING CURRENT INTERRUPTING DEVICE

CROSS-REFERENCE TO RELATED APPLICATIONS

This application claims priority to and the benefit of Korean Patent Application No. 10-2009-0094012, filed on Oct. 1, 2009, the entire content of which is incorporated herein by reference.

BACKGROUND

1. Field

Embodiments relate to a current interrupting device that senses temperature variations to interrupt a current, and a secondary battery including such a current interrupting device.

2. Description of the Related Technology

With the trend of lightweight and highly functional portable wireless devices, such as video cameras, mobile phones, and portable computers, research is being actively carried out on secondary batteries functioning as driving power sources of the portable wireless devices. For example, second batteries can include nickel-cadmium batteries, nickel-hydrogen batteries, nickel-zinc batteries, and lithium secondary batteries. Of these, the lithium secondary batteries may be rechargeable and adapted for miniaturization and high capacity. In addition, since the lithium secondary batteries typically have high operation voltages and high energy density per a unit weight, the lithium secondary batteries are widely used in high-end electronic devices.

Such a secondary battery may be formed by disposing a generating unit including a positive electrode plate, a negative electrode plate, and a separator, that is, an electrode assembly in a metal can, and by injecting electrolyte in the can and sealing the can. As such, the secondary battery sealed with the can may include an electrode terminal insulated from the can and disposed on the upper side, so that the electrode terminal functions as a pole, and the can functions as the opposite pole.

A secondary battery can include a battery safety device, such as a protecting circuit module (PCM) controlling the charge or discharge of the battery or a secondary protective device replacing the PCM, and the battery safety device may be disposed in a battery pack. Such battery safety devices are typically connected to a positive electrode and a negative electrode to interrupt a current when the temperature of a battery is increases excessively or when the voltage of the battery increases quickly by overdischarge or overcharge of the battery, thus preventing accidents such as explosion of the battery.

SUMMARY

Embodiments are therefore directed to a current interrupting device and a secondary battery including the same, which substantially overcome one or more problems caused by the limitations and disadvantages of the related art.

One embodiment provides a current interrupting device and a secondary battery including the same, which improve stability against overcharge and short circuits caused by high temperature.

Another embodiment provides a current interrupting device and a secondary battery including the same, which reduce manufacturing costs.

Another embodiment provides a current interrupting device and a secondary battery including the same, which are adapted for mass production conditions.

At least one of the above and other features and advantages may be realized by providing a current interrupting device including: a first terminal; a second terminal; a fuse coupled to the first and second terminals; and a fuse body surrounding an exterior of the fuse to seal the fuse, wherein the first and second terminals include thin portions to which the fuse is connected, and the thin portions have a thickness less than a thickness of the other portions of the first and second terminals.

The first and second terminals according to embodiments may be formed of nickel, copper, iron, or an alloy including at least two thereof.

According to an embodiment, the first and second terminals may be formed of about 64% iron and about 36% nickel.

According to an embodiment, the fuse may have a melting point of 98° C.±3° C. or greater.

According to an embodiment, the fuse body may include a cover attached to the upper surfaces of the first and second terminals, and a base attached to the lower surfaces of the first and second terminals, and ends of the first and second terminals may be sealed within the cover and the base, and be connected to the fuse.

According to an embodiment, the fuse body may include a cover attached to the upper surfaces of the first and second terminals, and a base attached to the upper surfaces of the first and second terminals, and portions of the first and second terminals may pass through the base and be connected to the fuse.

According to embodiments, the fuse body may be formed of a resin that includes one of polyethylenenaphthalate, polyethylenterephthalate, polyamide, polyimide, polybutyleneterephthalate, polyphenyleneoxide, polyethylenesulfide, polysulfone, and a mixture thereof.

According to an embodiment, the fuse body may have a film shape.

According to embodiments, the thickness of the thin portion may range from about ½ to about ¾ the thickness of the first and second terminals.

According to embodiments, the thickness of the first and second terminals may be about 0.4 mm, and the thickness of the thin portion may range from about 0.2 mm to about 0.3 mm. The thickness of the thin portion may be about 0.25 mm.

According to embodiments, the thickness of the first and second terminals may be about 0.3 mm, and the thickness of the thin portion may range from about 0.15 mm to about 0.25 mm. The thickness of the thin portion may be about 0.2 mm.

According to an embodiment, the thin portion may have an area to allow the fuse body to be attached to the first and second terminals.

At least one of the above and other features and advantages may be realized by providing a secondary battery including: a can; an electrode assembly in the can; and a cap assembly coupled to an open upper end of the can to seal the can and function as an electrical connection to an exterior, wherein the cap assembly includes a thermal fuse configured to interrupt a current when a temperature is increased by overcharge and overdischarge of the electrode assembly.

According to an embodiment, the thermal fuse may be disposed in the can, and be electrically connected to the electrode assembly and the cap assembly.

According to an embodiment, the cap assembly may include a cap plate coupled to an upper portion of the can, a negative terminal inserted into the cap plate with a gasket therebetween, an insulating plate disposed on a lower surface of the cap plate, and a terminal plate disposed on a lower surface of the insulating plate and electrically connected to the negative terminal, and the terminal plate may be the thermal fuse.

According to an embodiment, the insulating plate may have a side provided with a stopper, and the terminal plate may have a side provided with a stopper indentation corresponding to the stopper.

According to an embodiment, the thermal fuse may include: a first terminal; a second terminal; a fuse coupled to the first and second terminals; and a fuse body surrounding an exterior of the fuse to seal the fuse, wherein the first and second terminals include thin portions to which the fuse is connected, and the thin portions have a thickness less than a thickness of the other portions of the first and second terminals.

According to embodiments, the first and second terminals may be formed of nickel, copper, iron, or an alloy including at least two thereof.

According to embodiments, the first and second terminals may be formed of about 64% iron and about 36% nickel.

According to embodiments, the fuse may have a melting point of 98° C.±3° C. or greater.

According to an embodiment, the fuse body may include a cover attached to upper surfaces of the first and second terminals, and a base attached to lower surfaces of the first and second terminals, and ends of the first and second terminals may be sealed within the cover and the base and be connected to the fuse.

According to an embodiment, the fuse body may include a cover attached to upper surfaces of the first and second terminals, and a base attached to the upper surfaces of the first and second terminals, and portions of the first and second terminals may pass through the base and be connected to the fuse.

According to embodiments, the fuse body may be formed of a resin that includes one of polyethylenenaphthalate, polyethylenterephthalate, polyamide, polyimide, polybutyleneterephthalate, polyphenyleneoxide, polyethylenesulfide, polysulfone, and a mixture thereof.

According to embodiments, the thickness of the thin portion may range from about ½ to about ¾ the thickness of the first and second terminals.

According to embodiments, the thickness of the first and second terminals may be about 0.4 mm, and the thickness of the thin portion may range from about 0.2 mm to about 0.3 mm. The thickness of the thin portion may be about 0.25 mm.

According to embodiments, the thickness of the first and second terminals may be about 0.3 mm, and the thickness of the thin portion may range from about 0.15 mm to about 0.25 mm. The thickness of the thin portion may be about 0.2 mm.

According to an embodiment, the thin portion may have an area to allow the fuse body to be attached to the first and second terminals.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
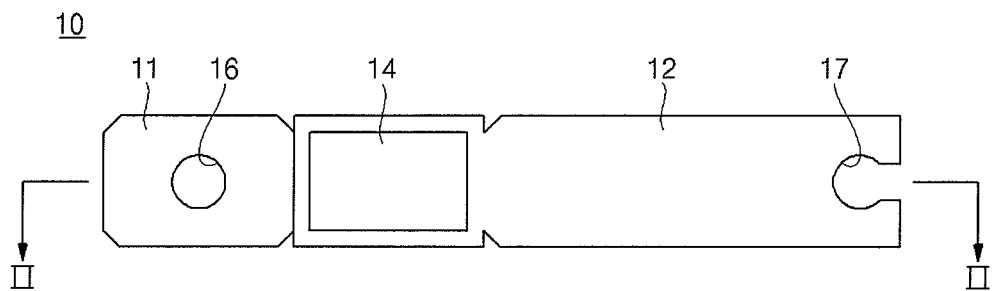
FIG. 1 is a plan view illustrating a thermal fuse according to an embodiment.
Figure 2:
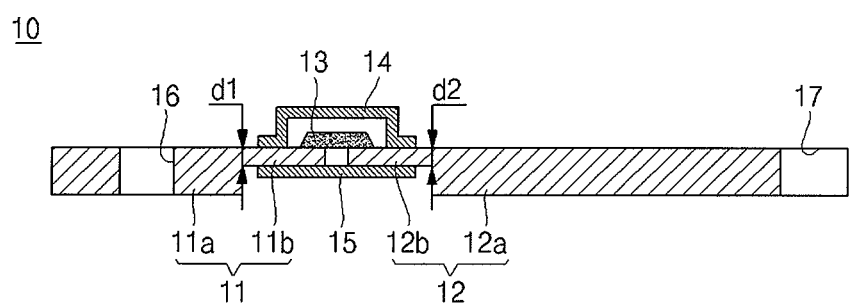
FIG. 2 is a cross-sectional view taken along line II-II of FIG. 1.

Embodiments will now be described more fully hereinafter with reference to the accompanying drawings; however, they may be embodied in different forms and should not be construed as limited to the embodiments set forth herein. Like reference numerals denote like elements throughout.

Hereinafter, embodiments will be described in detail with reference to the accompanying drawings.

A current interrupting device according to an embodiment is a secondary protective device configured to interrupt a current according to temperature variations.

According to an embodiment, a thermal fuse 10 is used as the secondary protective device. The thermal fuse 10 can include a first terminal 11, a second terminal 12, a fuse 13 connecting the first and second terminals 11 and 12 to each other, and fuse bodies 14 and 15 surrounding the outer appearance of the fuse 13 to seal the fuse 13. The first and second terminals 11 and 12 can include thin portions 11b and 12b to which the fuse 13 is connected. The thin portions 11b and 12b can have a smaller thickness than that of the other portions.

The first and second terminals 11 and 12 may be formed of one of nickel, copper, iron, and an alloy including at least two thereof. For example, the first and second terminals 11 and 12 may be formed of invar that includes about 64% iron and about 36% nickel and has a very small coefficient of thermal expansion.

The first terminal 11 can include a main body 11a and the thin portion 11b that is disposed at an end of the main body 11a and can have a smaller thickness than that of the main body 11a. The fuse 13 may be connected to the thin portion 11b.

The first ends of the fuse bodies 14 and 15 may be attached to the thin portion 11b. The second terminal 12 may include a main body 12a and the thin portion 12b integrally formed with an end of the main body 11a. The fuse 13 may be connected to the thin portion 12b, and the second ends of the fuse bodies 14 and 15 may be attached to the thin portion 12b.

First ends of the fuse bodies 14 and 15 may be attached through heat welding to the upper and lower surfaces of the thin portions 11b and 12b provided to the first and second terminals 11 and 12, thus, facilitate attaching of the fuse bodies 14 and 15 to the thin portions 11b and 12b. Since a welding material may be heated on both sides of an object (a first terminal or second terminal) through heat welding, a thick object may not be adapted for heat welding. Since the thin portions 11b and 12b can have a small thickness, the fuse bodies 14 and 15 may be effectively attached to the thin portions 11b and 12b to improve the sealing strength (sealing force).

According to embodiments, the thickness of the thin portions 11b and 12b can range from about ½ to about ¾ the thickness of the first and second terminals 11 and 12.

For example, when the first and second terminals 11 and 12 of the thermal fuse 10 has a thickness of about 0.4 mm, the thin portions 11b and 12b may have a thickness ranging from about 0.2 mm to about 0.3 mm. According to embodiments, when the fuse bodies 14 and 15 are attached to the first and second terminals 11 and 12, having a thickness of about 0.4 mm, the attaching strength of the fuse bodies 14 and 15 may decreased. Thus, the sealing performance of the fuse bodies 14 and 15 for the fuse 13 may be degraded. Accordingly, the thin portions 11b and 12b of the first and second terminals 11 and 12, to which the fuse bodies 14 and 15 are attached, should have a small thickness. For example, when the first and second terminals 11 and 12 have a thickness of about 0.4 mm according to an embodiment, the thin portions 11b and 12b may have a thickness of about 0.25 mm.

Alternatively, when the first and second terminals 11 and 12 of the thermal fuse 10 have a thickness of about 0.3 mm according to another embodiment, the thin portions 11b and 12b may have a thickness ranging from about 0.15 mm to about 0.25 mm. For example, when the first and second terminals 11 and 12 have a thickness of about 0.3 mm, the thin portions 11b and 12b may have a thickness of about 0.2 mm.

According to embodiments, test result of a thermal fuse having first and second terminals 11 and 12 with a thickness of 0.3 mm, and a test result of a thermal fuse having the first and second terminals 11 and 12 with a thickness of 0.4 mm are as follows.

A performance test of the thermal fuses was performed through a sealing test and a compression test.

In the sealing test, a sealing state was evaluated at a high temperature and a high internal pressure. Referring to Table 1, terminal sealing states of the two thermal fuses were stable at 135° C. When the temperature was over 140° C., the sealing state of the first and second terminals 11 and 12 having a thickness of 0.3 mm was maintained, but the sealing state of the first and second terminals 11 and 12 having a thickness of 0.4 mm was not maintained.

TABLE 1

Sealing States Exposed at 135° C. and 140° C. for 10 Minutes.

| Exposure | terminal thickness | |
|---|---|---|
| temperature | 0.3 mm | 0.4 mm |
| 135° C. | OK | OK |
| 140° C. | OK | Decrease in Sealing Force |

In the compression test, the sealing states of the first and second terminals 11 and 12 to which a load is applied at 135° C. were evaluated.

Referring to Table 2, although the first and second terminals 11 and 12 having a thickness of 0.3 mm were bent within 0.2 kgf and 0.3 kgf, the sealing state thereof were maintained. However, although the first and second terminals 11 and 12 having a thickness of 0.4 mm were not bent within 0.2 kgf and 0.3 kgf, the sealing state thereof were not maintained.

TABLE 2

Sealing States after Compressing Terminals for 1 Minute (exposed at 135° C. for 10 Minutes)

| | terminal thickness | |
|---|---|---|
| Applied pressure | 0.3 mm | 0.4 mm |
| 0.10 kgf | OK | OK |
| 0.20 kgf | OK (Just Terminal Bending) | Decrease in Sealing Force (No Terminal Bending) |
| 0.30 kgf | OK (Just Terminal Bending) | Decrease in Sealing Force (No Terminal Bending) |

TABLE 2-continued

Sealing States after Compressing Terminals for 1 Minute (exposed at 135° C. for 10 Minutes)

| | terminal thickness | |
|---|---|---|
| Applied pressure | 0.3 mm | 0.4 mm |

The thin portions 11b and 12b of the first and second terminals 11 and 12 may have a length to just allow the fuse bodies 14 and 15 to be attached to the first and second terminals 11 and 12.

The first terminal 11 may be provided with a terminal hole 16, and the second terminal 12 may be provided with a stopper indentation 17 having an open side, which will be described in detail in the following embodiment relating to a secondary battery.

The fuse 13 may be formed of tin or lead, but the material thereof is not limited thereto. For example, an alloy including Sn, Bi, In, and Zn, or an alloy including Sn, In, and Zn, which is free from environmental pollution, may be used.

Flux (not shown) may be applied to the fuse 13. The fuse 13 may have a melting point of 98° C.±3° C. A battery including the current interrupting device according to the present embodiment may have an inner temperature of about 90° C. or greater during high rate discharges. Thus, the fuse 13 may have an operation temperature of 98° C.±3° C. according to embodiments. The upper limit of the operation temperature of the fuse 13 may have a temperature that prevents explosion or burning of a secondary battery, according to an embodiment.

The fuse bodies 14 and 15 may also be referred to as a cover attached to the upper surfaces of the first and second terminals 11 and 12 and a base attached to the lower surfaces of the first and second terminals 11 and 12, respectively.

The upper surface of a first end of the first terminal 11, and the upper surface of a first end of the second terminal 12 may be provided with the cover 14. The lower surface of the first end of the first terminal 11, and the lower surface of the first end of the second terminal 12 may be provided with the base 15. The cover 14 and the base 15 may be attached through one of heat welding, supersonic welding, and laser irradiation.

Thus, the first ends of the first and second terminals 11 and 12 may be sealed in the cover 14 and the base 15 and connected to the fuse 13.

The cover 14 and the base 15 may be formed of resin. For example, the cover 14 and the base 15 may be formed of one of polyethylenenaphthalate, polyethylenterephthalate, polyamide, polyimide, polybutyleneterephthalate, polyphenyleneoxide, polyethylenesulfide, polysulfone, and a mixture thereof.

Resin of the cover 14 and the base 15 may be formed as a film. The cover 14 and the base 15 may be formed of an identical material or materials that are from each other.

Figure 3:
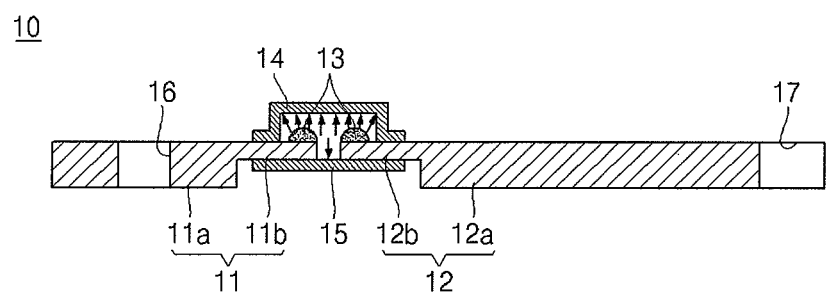
FIG. 3 is a schematic view illustrating the operation of a thermal fuse according to an embodiment.
Figure 4:
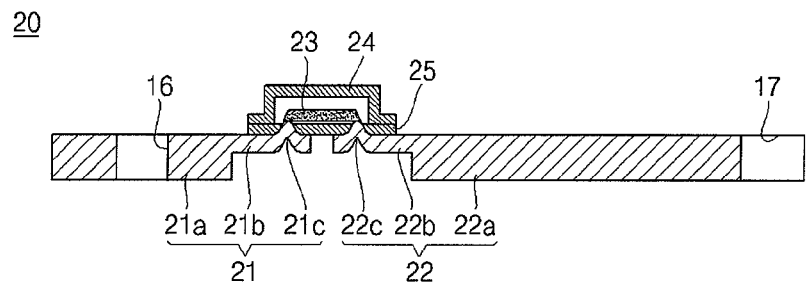
FIG. 4 is a cross-sectional view illustrating a thermal fuse according to an embodiment.
Figure 5:
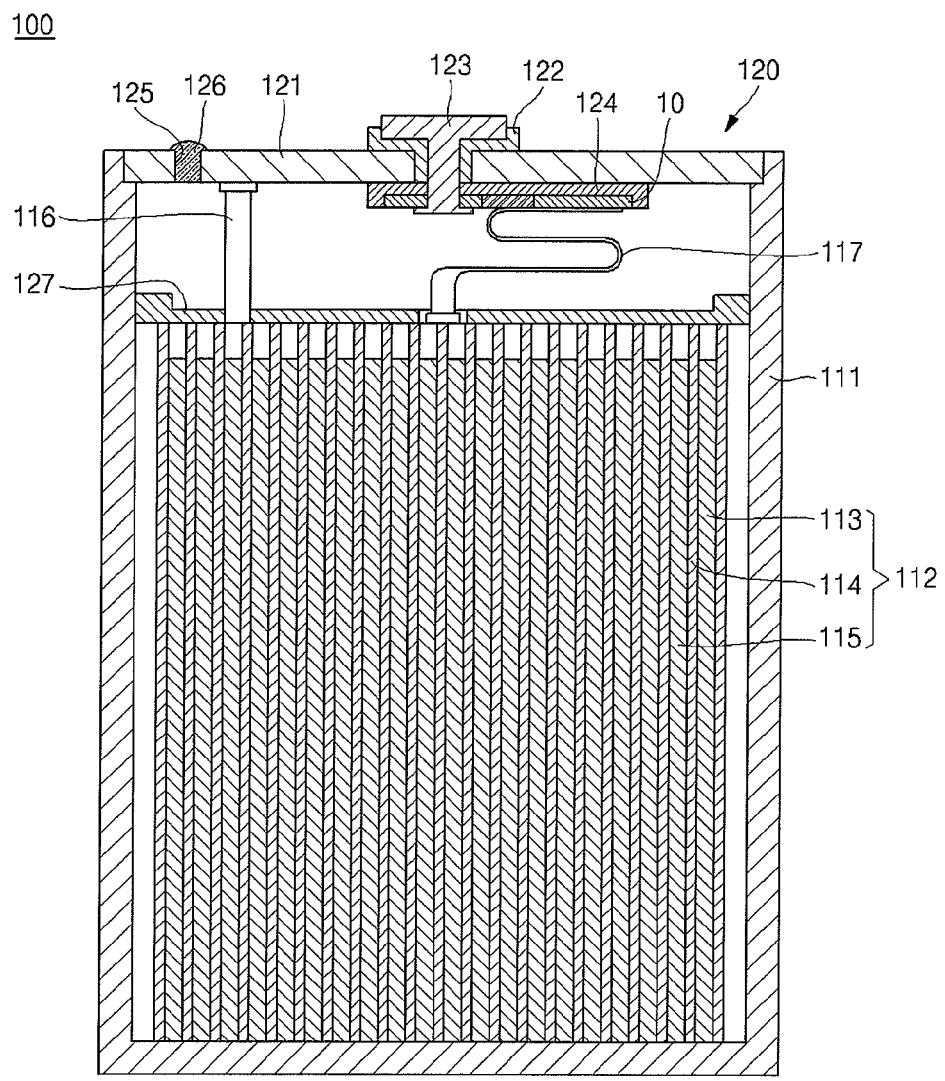
FIG. 5 is a cross-sectional view illustrating a secondary battery according to an embodiment.
Figure 6:
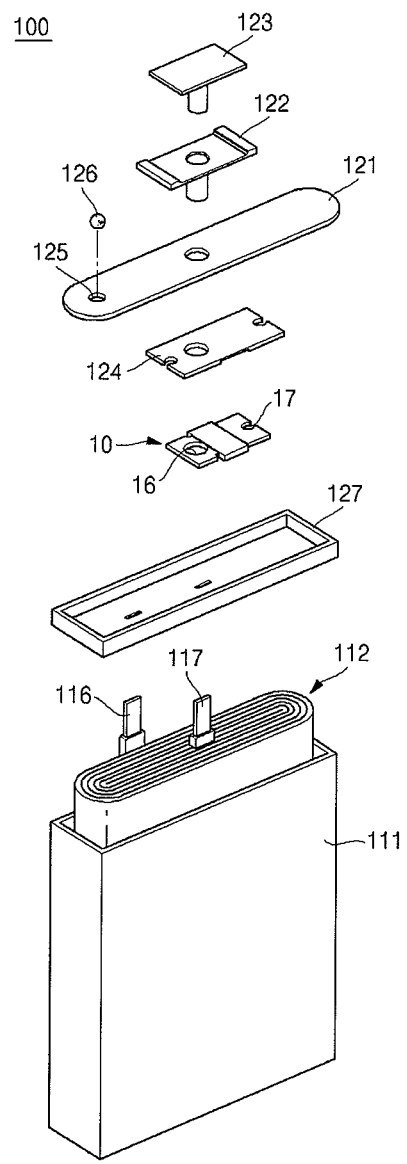
FIG. 6 is an exploded perspective view illustrating a secondary battery according to an embodiment.
Figure 7:
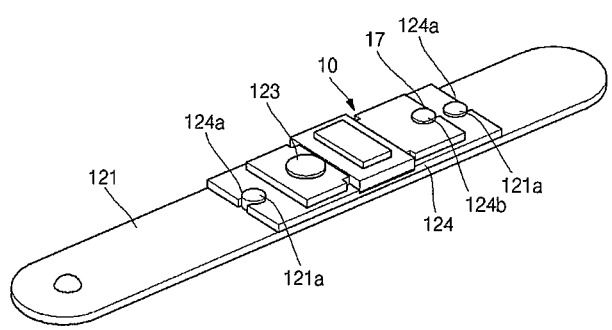
FIG. 7 is a perspective view illustrating the lower portion of a cap assembly of a secondary battery according to an embodiment.

Referring to FIG. 3, when an ambient temperature is higher than a set operation temperature, the fuse 13 of the thermal fuse 10 may be melted and broken. Accordingly, the electrical connection between the first terminal 11 and the second terminal 12 may be cut to prevent burning and explosion due to an overcurrent.

Hereinafter, a thermal fuse 20 will now be described according to an embodiment.

The thermal fuse 20 can include a first terminal 21, a second terminal 22, a fuse 23 connecting the first and second terminals 21 and 22 to each other, and fuse bodies 24 and 25 surrounding the outer appearance of the fuse 23 to seal the fuse 23. The first and second terminals 21 and 22 can include thin portions 21b and 22b to which the fuse 23 is connected. The thin portions 21b and 22b can have a smaller thickness than that of the other portions.

Since the first and second terminals 21 and 22 and the fuse 23 may be partially the same as those of the previous embodiment, a description thereof will be omitted.

The first and second terminals 21 and 22 may include main bodies 21a and 22a, the thin portions 21b and 22b may be disposed at the first ends of the main bodies 21a and 22a, and bent portions 21c and 22c protruding from the thin portions 21b and 22b, respectively.

The fuse bodies 24 and 25 may be the same as those of the previous embodiment in that a cover (also denoted by 24) may be attached to the upper surfaces of the first and second terminals 21 and 22. However, a base (also denoted by 25), together with the cover 24, may also be attached to the upper surfaces of the first and second terminals 21 and 22. In this case, the bent portions 21c and 22c of the first and second terminals 21 and 22 pass through the base 25. The bent portions 21c and 22c passing through the base 25 may be connected to each other through the fuse 23. Thus, the first and second terminals 21 and 22 may be connected to each other through the fuse 23. The fuse 23 may be sealed by the cover 24 and the base 25.

Since operation of the thermal fuse 20 may be the same as that of the thermal fuse 10, a description thereof will be omitted.

Hereinafter, a secondary battery 100 will now be described according to an embodiment.

The secondary battery 100 can include a can 111 having an open upper end, an electrode assembly 112 disposed in the can 111, a cap assembly 120 coupled to the open upper end of the can 111 to seal the can 111, and the thermal fuse 10 functioning as a secondary protective device electrically connected to the electrode assembly 112 and the cap assembly 120. The thermal fuse 10 may be disposed in the can 111.

The can 111 may be a prismatic type metal case having an inner space. The electrode assembly 112 can include a positive electrode plate 113, a separator 114, and a negative electrode plate 115 that are stacked, or wound in a jelly roll shape. Although the electrode assembly 112 has a jelly roll shape in the illustrated embodiment, a stack type electrode assembly may be used.

A positive lead 116 and a negative lead 117 can extend from the positive electrode plate 113 and the negative electrode plate 115, respectively.

The cap assembly 120 can include a cap plate 121 coupled to the upper portion of the can 111, a negative terminal 123 inserted into the cap plate 121 with a gasket 122 therebetween, an insulating plate 124 disposed on the lower surface of the cap plate 121, and a terminal plate disposed on the lower surface of the insulating plate 124 and electrically connected to the negative terminal 123. The cap plate 121 may be provided with an electrolyte injection hole 125 providing a passage through which electrolyte is injected into the can 111. The electrolyte injection hole 125 may be sealed by a ball 126 after electrolyte is injected into the can 111. The positive lead 116 may be directly connected to the lower surface of the cap plate 121, and the negative lead 117 may be electrically connected to the negative terminal 123 through the terminal plate.

An insulating case 127 for insulating the electrode assembly 112 from the cap assembly 120 may be disposed on the upper portion of the electrode assembly 112 in the can 111.

According to the current embodiment, the thermal fuse 10 may be used as the terminal plate. Thus, the thermal fuse 10 may be disposed in the can 111, and electrically connected to the negative lead 117.

Stoppers 121a may be disposed on the lower surface of the cap plate 121. Both ends of the insulating plate 124 disposed on the lower surface of the cap plate 121 may be provided with stopper indentations 124a to which the stoppers 121a are fitted and fixed. This can prevent the insulating plate 124 from rotating relative to the cap plate 121.

A stopper 124b may be disposed on a first side of the lower surface of the insulating plate 124. The stopper indentation 17 may be disposed on a first side of the thermal fuse 10 disposed on the lower surface of the insulating plate 124. The stopper indentation 17 may be fitted into the stopper 124b, so that the first side of the thermal fuse 10 is fixed to the insulating plate 124. This can prevent the thermal fuse 10 from rotating relative to the insulating plate 124. The negative terminal 123 can pass through terminal holes respectively of the cap plate 121, the insulating plate 124 and the thermal fuse 10, and may be fixed through a spinning process. When the spinning process is performed, the insulating plate 124 may not rotate relative to the cap plate 121. Furthermore, the thermal fuse 10 may not rotate relative to the insulating plate 124.

The secondary battery configured as described above can include the thermal fuse 10 which functions as a secondary protective device sensing excessive temperature increase due to overdischarge or overcharge. The thermal fuse 10 may be disposed within the can 111 in the secondary battery.

The thermal fuse 10, disposed on the lower surface of the cap plate 121, can function as a terminal plate. Thus, the thermal fuse 10 disposed in the can 111, may be adjacent to the electrode assembly 112, and electrically connected to the negative lead 117, thus sensing excessive temperature increase in the secondary battery and interrupting a current.

According to an embodiment, the current interrupting device and the secondary battery can secure stability against overcharge and short circuits caused by high temperatures.

According to an embodiment, the current interrupting device and the secondary battery can reduce manufacturing costs.

According to an embodiment, the current interrupting device and the secondary battery may be adapted for mass production conditions.

Embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A current interrupting device comprising:
   a first terminal;
   a second terminal;
   a fuse coupled to the first and second terminals; and
   a fuse body surrounding an exterior of the fuse to seal the fuse,
   wherein the first and second terminals include main bodies and thin portions directly connected to the fuse, and the thin portions are integrally formed with the main bodies so that the thin portions and the main bodies are formed of the same material and so that the thin portions and the main bodies define a continuous body and wherein the thin portions have a thickness less than a thickness of main bodies of the first and second terminals.

2. The current interrupting device as claimed in claim 1, wherein the first and second terminals each includes a main body, the thin portion, and a bent portion that is a protruding portion of the thin portion, and the thickness of the thin portion is less than that of the main body.

3. The current interrupting device as claimed in claim 1, wherein the first and second terminals are formed of a material selected from a group consisting of nickel, copper, iron, and an alloy including at least two thereof.

4. The current interrupting device as claimed in claim 1, wherein the first and second terminals are formed of about 64% iron and about 36% nickel.

5. The current interrupting device as claimed in claim 1, wherein the fuse has a melting point of 98° C.±3° C. or greater.

6. The current interrupting device as claimed in claim 1, wherein the fuse body comprises a cover attached to upper surfaces of the first and second terminals, and a base attached to lower surfaces of the first and second terminals, and the first and second terminals each have ends that are sealed within the cover and the base and are connected to the fuse.

7. The current interrupting device as claimed in claim 1, wherein the fuse body comprises a cover attached to upper surfaces of the first and second terminals, and a base attached to the upper surfaces of the first and second terminals, and portions of the first and second terminals pass through openings in the base and are connected to the fuse.

8. The current interrupting device as claimed in claim 1, wherein the fuse body is formed of resin selected from a group comprising polyethylenenaphthalate, polyethylenterephthalate, polyamide, polyimide, polybutyleneterephthalate, polyphenyleneoxide, polyethylenesulfide, polysulfone, and a mixture thereof.

9. The current interrupting device as claimed in claim 1, wherein the fuse body has a film shape.

10. The current interrupting device as claimed in claim 1, wherein the thickness of the thin portion ranges from about ½ to about ¾ thickness of that of the first and second terminals.

11. The current interrupting device as claimed in claim 10, wherein the thickness of the first and second terminals is about 0.4 mm, and the thickness of the thin portion is about 0.25 mm.

12. The current interrupting device as claimed in claim 10, wherein the thickness of the first and second terminals is about 0.3 mm, and the thickness of the thin portion is about 0.25 mm.

13. The current interrupting device as claimed in claim 1, wherein the thin portion has an area to allow the fuse body to be attached to the first and second terminals.

* * * * *